United States Patent
Yazdan Panah et al.

(10) Patent No.: US 10,951,275 B2
(45) Date of Patent: *Mar. 16, 2021

(54) SYSTEM AND METHOD FOR TWO-WAY RELAYING WITH BEAMFORMING

(71) Applicant: Futurewei Technologies, Inc., Plano, TX (US)

(72) Inventors: Ali Yazdan Panah, Austin, TX (US); Philippe Sartori, Plainfield, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,641

(22) Filed: Mar. 15, 2019

(65) Prior Publication Data
US 2019/0215038 A1 Jul. 11, 2019

Related U.S. Application Data

(63) Continuation of application No. 15/606,693, filed on May 26, 2017, now Pat. No. 10,256,873, which is a (Continued)

(51) Int. Cl.
*H04B 7/0417* (2017.01)
*H04B 7/155* (2006.01)
*H04B 7/0456* (2017.01)

(52) U.S. Cl.
CPC .......... *H04B 7/0417* (2013.01); *H04B 7/155* (2013.01); *H04B 7/0465* (2013.01)

(58) Field of Classification Search
CPC .............................. H04B 7/0417; H04B 7/155
See application file for complete search history.

(56) References Cited

U.S. PATENT DOCUMENTS

| 5,596,439 A | 1/1997 | Dankberg et al. |
| 9,686,000 B2 | 6/2017 | Panah et al. |
| (Continued) | | |

FOREIGN PATENT DOCUMENTS

| CN | 101277172 A | 10/2008 |
| CN | 101465814 A | 6/2009 |
| (Continued) | | |

OTHER PUBLICATIONS

Chen, M., et al., "Interference Management for Multiuser Two-Way Relaying," Annual Conference on Information Sciences and Systems, Mar. 2008, pp. 246-251.

(Continued)

*Primary Examiner* — Fahmida S Chowdhury
(74) *Attorney, Agent, or Firm* — Slater Matsil, LLP

(57) ABSTRACT

A system and method for two-way relaying with beamforming are provided. A method for relay operations includes estimating communications channels between a relay and communications devices coupled to the relay, storing data contained in the transmissions, storing data contained in the transmissions, precoding a transmission including a subset of the stored data with a precoding matrix, and transmitting the precoded transmission. The estimating is based on transmissions made by the communications devices in the subset of communications devices, and the precoding matrix is based on estimates of the communications channels.

22 Claims, 9 Drawing Sheets

Related U.S. Application Data continuation of application No. 13/088,055, filed on Apr. 15, 2011, now Pat. No. 9,686,000.

(56) References Cited

U.S. PATENT DOCUMENTS

| | | | | |
|---|---|---|---|---|
| 2009/0190634 | A1* | 7/2009 | Bauch | H04L 25/20 375/211 |
| 2010/0062708 | A1 | 3/2010 | Sangiamwong | |
| 2011/0026427 | A1 | 2/2011 | Wang et al. | |
| 2012/0020279 | A1 | 1/2012 | Kim et al. | |
| 2012/0294224 | A1 | 11/2012 | Silva et al. | |
| 2013/0010841 | A1* | 1/2013 | Seo | H04B 7/15521 375/214 |

FOREIGN PATENT DOCUMENTS

| | | |
|---|---|---|
| CN | 101483503 A | 7/2009 |
| CN | 101483622 A | 7/2009 |
| CN | 101515917 A | 8/2009 |
| CN | 101674131 A | 3/2010 |
| CN | 101741448 A | 6/2010 |
| CN | 101983490 A | 3/2011 |
| CN | 102014504 A | 4/2011 |
| EP | 1937006 A1 | 6/2008 |
| WO | 2008147121 A1 | 12/2008 |

OTHER PUBLICATIONS

Ghosh, A., et al., "LTE-Advanced: Next-Generation Wireless Broadband Technology," IEEE Wireless Communications, Jun. 2010, pp. 10-22.

Havary-Nassab, V., et al., "Optimal Distributed Beamforming for Two-Way Relay Networks," IEEE Transactions on Signal Processing, vol. 58, No. 3, Mar. 2010, pp. 1238-1250.

Laneman, J.N., et al., "Cooperative Diversity in Wireless Networks: Efficient Protocols and Outage Behavior," IEEE Transactions on Information Theory, vol. 50, No. 12, Dec. 2004, pp. 3062-3080.

Madsen, A. H., et al., "Capacity Bounds for Cooperative Diversity," IEEE Transactions on Information Theory, vol. 52, No. 4, Apr. 2006, pp. 1522-1544.

Peters, S. W., et al., "Relay Architectures for 3GPP LTE-Advanced," EURASIP Journal on Wireless Communications and Networking, vol. 209, Article ID 618787, 15 pages, Hindawi Publishing Corporation.

Shalvi, O., "Multiple Source Cooperation Diversity," IEEE Communications Letters, vol. 8, No. 12, Dec. 2004, pp. 712-714.

Zhang, R., et al., "Optimal Beamforming for Two-Way Multi-Antenna Relay Channel with Analogue Network Coding," IEEE Journal on Selected Areas in Communications, vol. 27, No. 5, Jun. 2009, pp. 699-712.

* cited by examiner

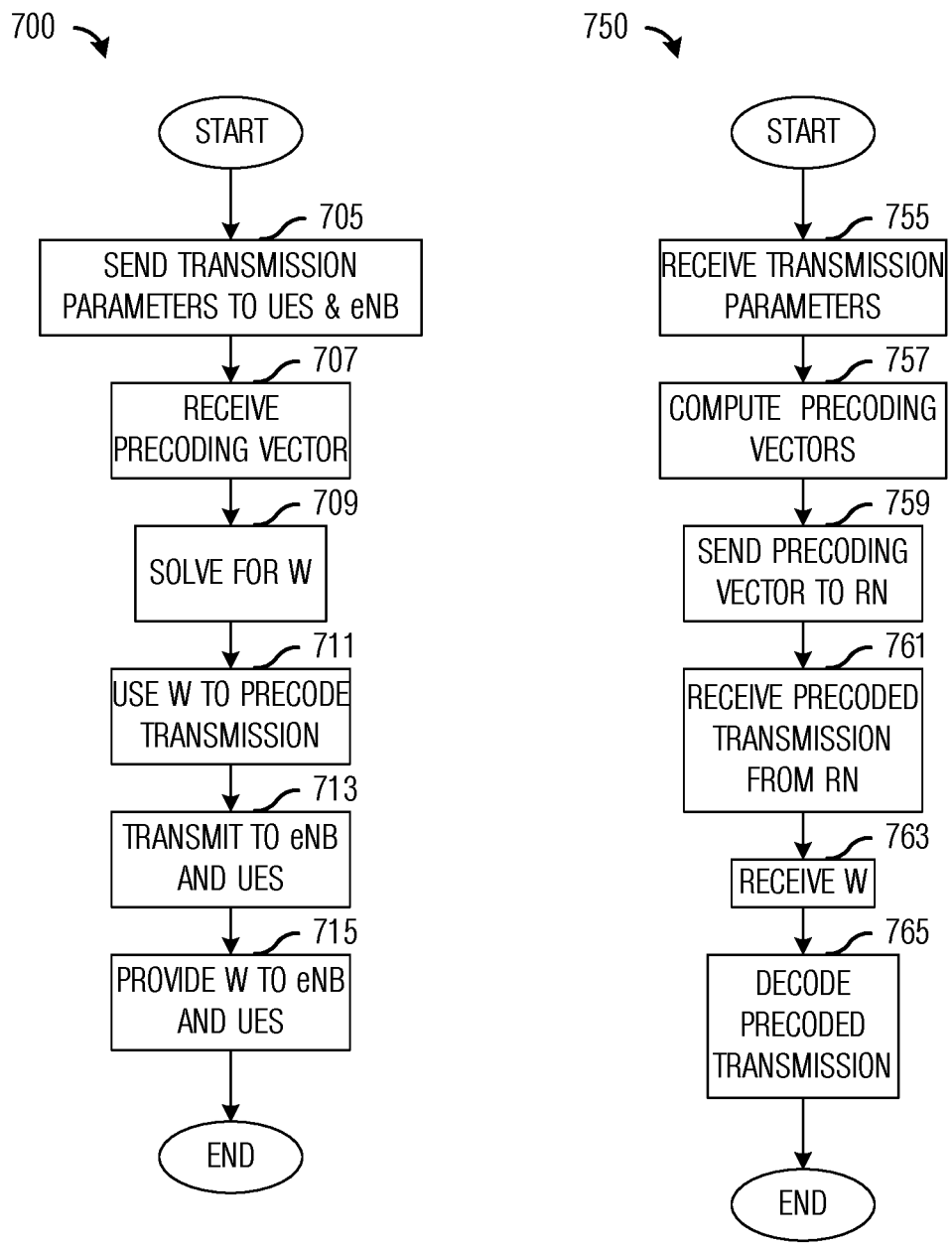

SYSTEM AND METHOD FOR TWO-WAY RELAYING WITH BEAMFORMING

CROSS-REFERENCE TO RELATED APPLICATIONS

This application is a continuation of U.S. patent application Ser. No. 15/606,693, entitled "System and Method for Two-Way Relaying With Beamforming," filed on May 26, 2017, which is a divisional of U.S. patent application Ser. No. 13/088,055, entitled "System and Method for Two-way Relaying with Beamforming," filed on Apr. 15, 2011, (now U.S. Pat. No. 9,686,000, issued Jun. 20, 2017) which applications are hereby incorporated herein by reference.

TECHNICAL FIELD

The present invention relates generally to digital communications, and more particularly to a system and method for two-way relaying with beamforming.

BACKGROUND

A relay node (RN), or simply relay, is considered as a tool to improve, e.g., the coverage of a base station, group mobility, temporary network deployment, the cell-edge throughput and/or to provide coverage in new areas. The RN is wirelessly connected to a wireless communications network via a donor cell (also referred to as a donor enhanced Node B (donor eNB or D-eNB)) through network resources donated by the D-eNB.

Generally, there may be several different types of RNs, including an amplify-and-forward RN, wherein a RN receives a transmission and then transmits the received transmission without performing any attempt at demodulating and/or decoding the received transmission. The RN may receive and transmit the transmission over different frequency bands or over different intervals of time to reduce self-interference. An amplify-and-forward RN may amplify and/or apply additional signal processing on the received transmission to help improve communications system performance. Another type of RN is a decode-and-forward RN: such a RN receives a transmission, demodulates and decodes it, re-encodes and re-modulates it (possibly using a different modulation and coding scheme) and then transmits it.

Another concept applicable to RNs, either amplify-and-forward or decode-and-forward, is a two-way RN. In a two-way RN, there is typically no concept of uplink and/or downlink transmission. Instead, there may be multiple transmission phases. For example, there may be a first transmission phase (referred to herein as Multiple Access Phase (MA) wherein communications devices coupled to the two-way RN, such as an eNB and User Equipment (UE), transmit simultaneously, and a second transmission phase (referred to herein as Broadcast Phase (BC), wherein the two-way RN broadcasts signals to the eNB and UEs coupled to the two-way RN.

Information theory indicates that two-way RNs may provide better link efficiency than traditional one-way RNs (e.g., amplify-and-forward RNs and decode-and-forward RNs) that still use the concept of uplink and downlink transmission, thereby improving overall communications system performance.

SUMMARY

These technical advantages are generally achieved, by example embodiments of the present invention which provide a system and method for two-way relaying with beamforming.

In accordance with an example embodiment of the present invention, a method for relay operations is provided. The method includes estimating communications channels between a relay and a subset of communications devices coupled to the relay. The estimating is based on transmissions made by the communications devices in the subset of communications devices. The method also includes storing a portion of the transmissions, and precoding a transmission comprising a combination of at least a subset of the stored portion of the transmissions with a precoding matrix. The precoding matrix is based on estimates of the communications channels. The method further includes transmitting the precoded transmission to the subset of communications devices.

In accordance with another example embodiment of the present invention, a method for relay operations is provided. The method includes transmitting transmission parameters to a subset of communications devices coupled to a relay, receiving precoding vectors from communications devices in the subset of communications devices, determining a precoding matrix from the precoding vectors, providing the precoding matrix to communications devices coupled to the relay, storing a portion of transmissions from the subset of communications devices, and transmitting a transmission comprising a combination of at least a subset of the stored portion of the transmissions. The transmission is precoded with the precoding matrix.

In accordance with another example embodiment of the present invention, a relay is provided. The relay includes a channel estimate unit, a memory, a precoder coefficient unit coupled to the channel estimate unit, a precoder coupled to the precoder coefficient unit and to the memory, and a transmitter coupled to the precoder. The channel estimate unit estimates communications channels between the relay and a subset of communications devices coupled to the relay. The estimating is based on transmissions made by the communications devices. The memory stores a portion of the transmissions from the communications devices, the precoder coefficient unit determines a precoding matrix based on the estimates of the communications channels, the precoder precodes a subset of the stored portion of the transmissions for transmission to the subset of communications devices, and the transmitter transmits the precoded subset of the stored portion of the transmissions.

In accordance with another example embodiment of the present invention, a method for relay operations is provided. The method includes receiving transmissions from a first type of communications device in a subset of communications devices coupled to a relay during a first interval, estimating communications channels between the relay and a subset of the first type of communications device transmitting to the relay, receiving transmissions from any type of communications device in the subset of communications devices coupled to the relay during a second interval, estimating communications channels between the relay and a subset of the any type of communications device transmitting to the relay during the second interval, and storing a portion of the transmissions from the any type of communications device.

In accordance with another example embodiment of the present invention, a method for communications device operations is provided. The method includes receiving transmission parameters from a relay, determining a precoding vector based on the transmission parameters, transmitting the precoding vector to the relay, transmitting a first transmission to the relay, and receiving a second transmission from the relay. The second transmission includes a precoded combination of at least a subset of a portion of transmissions received at the relay, and the transmissions were transmitted to the relay by a subset of communications devices coupled to the relay.

In accordance with another example embodiment of the present invention, a communications device is provided. The communications device includes a receiver, a precoding vector unit coupled to the receiver, and a transmitter coupled to the precoding vector unit. The receiver receives transmission parameters from a relay and receives a second transmission from the relay. The second transmission includes a precoded combination of at least a subset of a portion of transmissions received at the relay, and the transmissions were transmitted to the relay by a subset of communications devices coupled to the relay. The precoding vector unit determines a precoding vector based on the transmission parameters, and the transmitter transmits the precoding vector to the relay and to transmit a first transmission to the relay.

One advantage disclosed herein is that a RN may make use of precoding methods to enhance the sum-rate performance of the RN.

A further advantage of exemplary embodiments is that a transmission format is provided which allows for accurate determination (e.g., estimation) of communications channels between a RN and communications devices to which it is coupled to help improve communications performance. The transmission format may help the RN to determine communications channel information without requiring special signaling and/or processing techniques which may complicate implementation.

Another advantage of exemplary embodiments is that a distributed technique for determining precoding information is provided to help reduce computational overhead at the RN and the communications devices to which it is coupled. Reducing the computational overhead may reduce material costs as well as operational costs of the RN and the communications devices.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 7a illustrates an example flow diagram of RN operations in transmitting to communications devices coupled to a RN, wherein transmissions are precoded with a precoding matrix W that is determined in a distributed manner according to example embodiments described herein;

FIG. 7b illustrates an example flow diagram of communications device operations in receiving and decoding transmissions from a RN, wherein the transmissions are precoded with a precoding matrix W that is determined in a distributed manner according to example embodiments described herein;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a communications system that supports RNs to help improve overall communications system performance, such as communications systems that are Third Generation Partnership Project (3GPP) Long Term Evolution (LTE), WiMAX, IEEE 802.16, and so on, compliant.

Figure 1A:
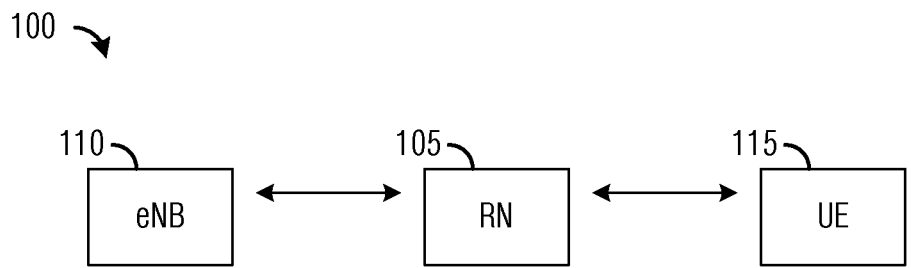
FIG. 1a illustrates an example communications system according to example embodiments described herein.

FIG. 1a illustrates a communications system 100. Communications system 100 includes a RN 105 coupled to an eNB no and a UE 115. According to an example embodiment, RN 105 may be operating as a two-way RN, wherein RN 105 may receive transmissions from both eNB no and UE 115 in a first phase (referred to as a MA phase) and then broadcast to both eNB no and UE 115 in a second phase (referred to as a BC phase). As with a normal RN, RN 105 may communicate using network resources assigned by a D-eNB. For example, eNB 110 may assign a portion of the network resources to RN 105. Denote RN 105 and UEs and/or eNBs operating with RN 105 as RN 105 operates in the first phase (MA phase) and the second phase (BC phase), as communications devices participating in two-way communications.

Figure 1B:
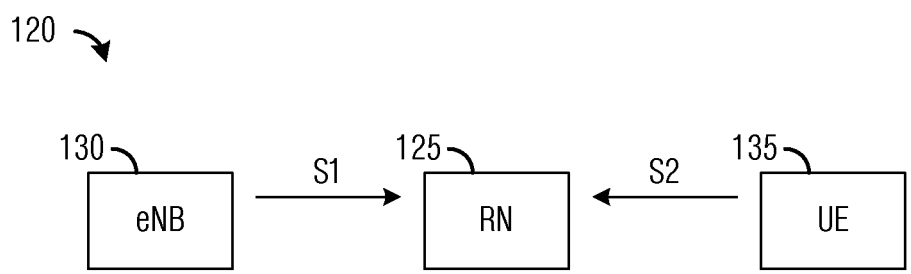
FIG. 1b, illustrates an example communications system with a RN operating in a MA phase according to example embodiments described herein.

FIG. 1b illustrates a communications system 120 with a two-way RN operating in the MA phase. While operating in the MA phase, a RN 125 may receive transmissions from an eNB 130 (shown as signal $S_1$) as well as transmissions from UE 135 (shown as signal S2). RN 125 may actually receive transmissions from multiple UE, but only one UE is shown in FIG. 1b to simplify FIG. 1b. RN 125 may simultaneously receive transmissions from eNB 130 and UE 135. RN 125 may also separately receive transmissions from eNB 130 and UE 135.

Figure 1C:
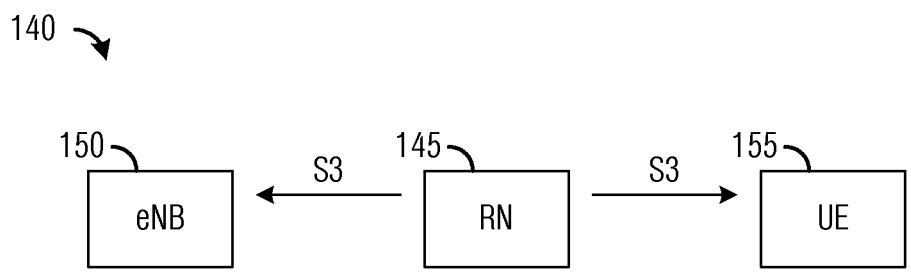
FIG. 1c illustrates an example communications system with a RN operating in a BC phase according to example embodiments described herein.

FIG. 1c illustrates a communications system 140 with a RN operating in a BC phase. While operating in the BC phase, a RN 145 may broadcast a transmission to an eNB 150 and a UE 155 (shown as signal S3). According to an example embodiment, signal S3 may be a combination of transmissions intended for eNB 150 and UE 155, e.g., S3=S1⊕S2, or the sum of the two received signals.

It is then up to eNB 150 and UE 155 to extract from S3, a transmission intended for it. As an example, at eNB 150, eNB 150 may extract Ŝ2 (a received version of S2 comprising S2 combined with a channel matrix H and possibly noise) from S3 by combining it with S1, e.g., Ŝ2=S1⊕S3.

Although shown in FIGS. 1a, 1b, and 1c as being coupled to a single eNB and a single UE, a RN may be coupled to a number of eNBs and a number of UEs. Usually, the RN may be coupled to at least one eNB, which may also serve as the RN's D-eNB. The RN may also be coupled to at least one UE. Therefore, the illustration and discussion of the RN being coupled to a single eNB and a single UE should not be construed as being limiting to either the scope or the spirit of the example embodiments.

Figure 2A:
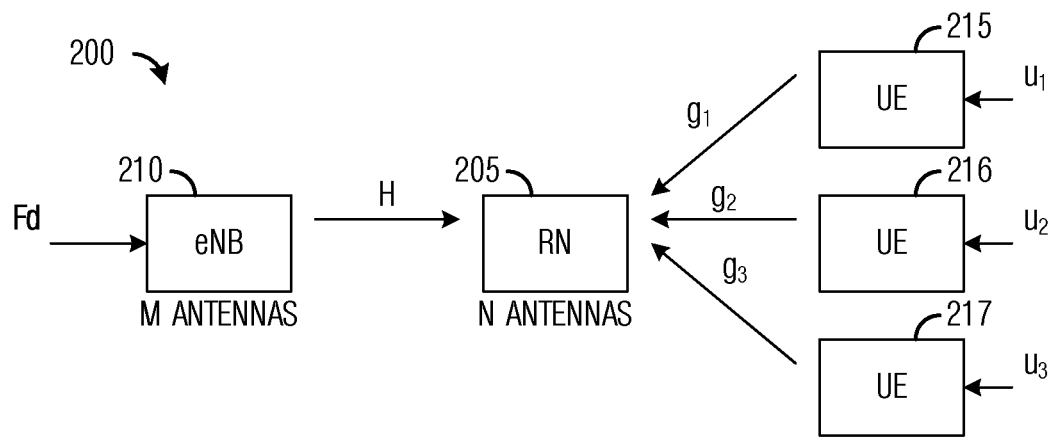
FIG. 2a illustrates an example model of a communications system with a RN operating in a RN phase according to example embodiments described herein.

FIG. 2a illustrates a model 200 of a communications system with a RN operating in a MA phase. Consider a communication system with a RN 205 coupled to an eNB 210 and K UEs, such as UE 215, UE 216, and UE 217, where K is a positive integer value. A communications channel between RN 205 and eNB 210 may be described with a channel matrix H, while communications channel between RN 205 and a k-th UE in the plurality of UEs as $g_k$.

Data, e.g., $\{d_1, d_2, \ldots, d_K\}$, intended for the K UEs may be beamformed by beamforming vectors, e.g., $\{f_1, f_2, \ldots, f_K\}$, and then transmitted by eNB 210 to RN 205. Data from a k-th UE, e.g., $u_k$, may be transmitted from the k-th UE to RN 205. The combined received signal at RN 205 may be expressed as $$r = Hx + \sum_{k=1}^{K} g_k u_k + n_r$$
$$= HFd + Gu + n_r,$$

where H is the channel matrix for a communications channel between eNB 210 and RN 205, $g_k$ (also G) is the channel matrix for a communications channel between the k-th UE and RN 205, $u_k$ (also u) is the data transmitted by the k-th UE, x (also Fd) is the data transmitted by eNB 210, and $n_r$ is the noise.

Figure 2B:
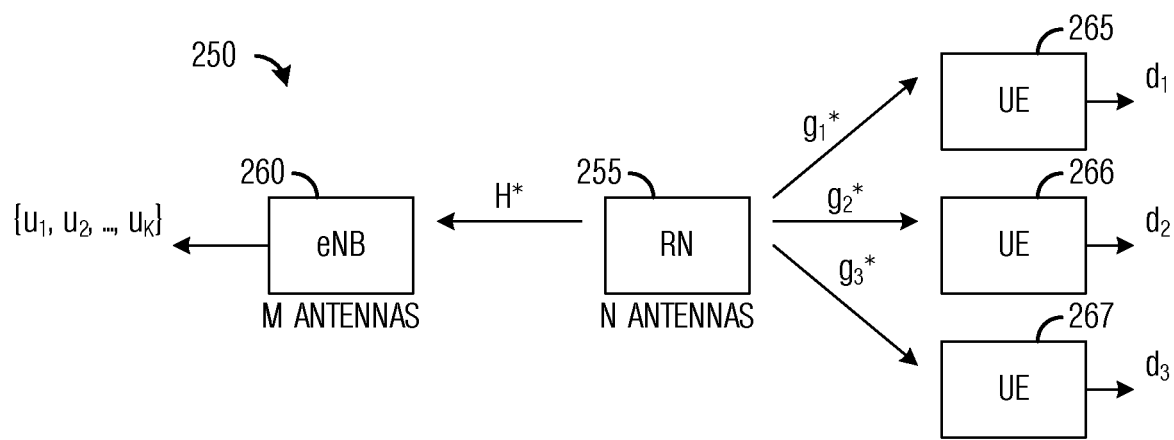
FIG. 2b illustrates an example model of a communications system with a RN operating in a BC phase according to example embodiments described herein.

FIG. 2b illustrates a model 250 of a communications system with a RN operating in a BC phase. Consider a communication system with a RN 255 coupled to an eNB 260 and a K UEs, such as UE 265, UE 266, and UE 267, where K is a positive integer value. A communications channel between RN 255 and eNB 260 may be described with a channel matrix H*, while communications channel between RN 255 and a k-th UE in the plurality of UEs as $g_k^*$.

Data, e.g., $\{d_1, d_2, \ldots, d_K\}$, transmitted by eNB 260 and intended for the K UEs may be beamformed by beamforming vectors, e.g., $\{f_1, f_2, \ldots, f_K\}$ and received by RN 255. Data from a k-th UE, e.g., $u_k$, to eNB 260 may be transmitted from the k-th UE and received by RN 255. A precoded combined received signal transmitted by RN 255 may be expressed as $$\tilde{r} = Wr = WHFd + W\sum_{k=1}^{K} g_k u_k + Wn_r,$$

where $\tilde{r}$ is the precoded combined received signal at RN 255, W is a precoder matrix for RN 255, r is a combined received signal at RN 255, H is the channel matrix for a communications channel between eNB 260 and RN 255, $g_k$ (also G) is the channel matrix for a communications channel between the k-th UE and RN 255, $u_k$ (also u) is the data transmitted by the k-th UE, x (also Fd) is the data transmitted by eNB 260, and $n_r$ is the noise. In general, precoding of the received signal r is needed to help improve performance.

The precoder matrix W may be constrained to satisfy a metric on the transmit power of the RN, for example, an average total transmit power may be constrained by $$\|\tilde{r}\|_2^2 = \|Wr\|_2^2 = tr(Wrr^*W^*) = P_r.$$

Assume that a time interval between MA and BC modes is small enough so that channel reciprocity holds, the signal received at the k-th UE is expressible as $$y_k = g_k^* \tilde{r} + n_k$$
$$= g_k^* WHFd + g_k^* W\sum_{k=1}^{K} g_k u_k + g_k^* Wn_r + n_k$$
$$= g_k^* WHf_k d_k + g_k^* Wg_k u_k + g_k^* WH\sum_{i \neq k}^{K} f_i d_i +$$
$$g_k^* W\sum_{i \neq k}^{K} g_i u_i + g_k^* Wn_r + n_k,$$

where $n_k \sim C\mathcal{N}(0,N_0)$ is AWGN at the UE. For clarity, the above expression for the signal received at the k-th UE is labeled below $$y_k = \underbrace{g_k^* W H f_k d_k}_{desired} + \underbrace{g_k^* W g_k u_k}_{self\_interference} + \underbrace{g_k^* W \left( \sum_{i \neq k}^{K} H f_i d_i + g_i u_i \right)}_{co-channel\ interference} + \underbrace{g_k^* W n_r + n_k}_{noise}.$$

The self-interference term $(g_k^* W g_k u_k)$ may be an important artifact of two-way relaying operation. Assuming that a UE has complete knowledge of its channel with the RN, e.g., obtained through a priori training or some other technique, as well as the precoder matrix W, e.g., obtained through signaling from the RN, the self-interference may be subtracted from $y_k$. Subsequently, detection may be performed on signal $$\bar{y}_k = g_k^* W H f_k d_k + I_k,$$

where $I_k$ is the total interference-plus-noise and is expressible as $$I_k = g_k^* W \left( \sum_{i \neq k}^{K} H f_i d_i + g_i u_i \right) + g_k^* W n_r + n_k.$$

For constant channels, the interference power averaged over random transmissions is expressible as $$E\{|I_k|^2\} = g_k^* W \left[ \left( \sum_{i \neq k}^{K} \frac{P_d}{K} H f_i f_i^* H^* + P_u g_i g_i^* \right) + N_0 I \right] W^* g_k + N_0$$

and a resulting SINR has the form of a generalized Rayleigh quotient $$SINR_k = \frac{g_k^* W A_k W^* g_k}{g_k^* W B_k W^* g_k},$$

where $$A_k = H f_k f_k^* H^*$$

and $$B_k = \sum_{i \neq k}^{K} \left( H f_i f_i^* H^* + \frac{K P_u}{P_d} g_i g_i^* \right) + \frac{K N_0}{P_d} \left( 1 + \frac{1}{g_k^* W W^* g_k} \right) I$$

and are N×N Hermitian matrices.

Figures 3A, 3B:
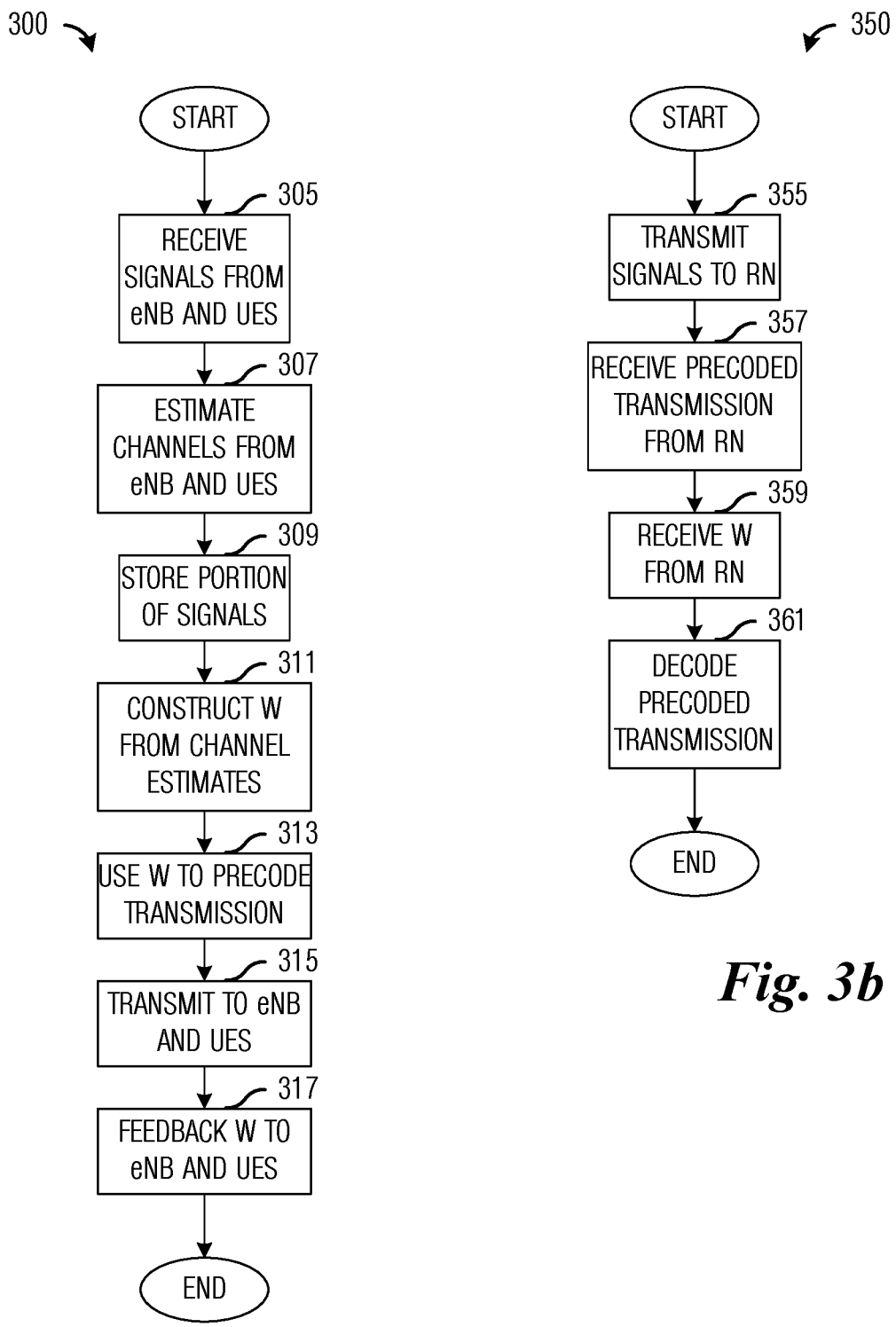
FIG. 3a illustrates an example flow diagram of RN operations in relaying transmissions, wherein a RN operates in a two-way relaying mode according to example embodiments described herein.
FIG. 3b illustrates an example flow diagram of communications device operations in communications, wherein a RN operating in a two-way relaying mode relays communications to and from a communications device according to example embodiments described herein.

FIG. 3a illustrates a flow diagram of RN operations 300 in relaying transmissions, wherein a RN operates in a two-way relaying mode. RN operations 300 may be indicative of operations occurring in a RN, such as RN 205 and RN 255, as the RN operates in the two-way relaying mode to relay information to communications devices, such as eNBs and UEs, coupled to the RN. RN operations 300 may occur while the RN is in the two-way relaying mode and is coupled to communications devices.

RN operations 300 may begin with the RN receiving signals (transmissions) from communications devices, such as eNBs and UEs, coupled to the RN (block 305). According to an embodiment, transmissions from the communications devices may arrive at the RN substantially simultaneously. In other words, transmissions from the eNBs and the UEs may all arrive at the RN at about the same time. According to another example embodiment, transmissions from the communications devices may arrive at the RN in independent phases, i.e., transmissions from the eNBs may be received in a separate phase from the transmissions from the UEs. Furthermore, if there are large numbers of UEs coupled to the RN, transmissions from the UEs may be partitioned into multiple separate phases as well. For example, a first portion (or there about) of the UEs may transmit to the RN in a first phase, a second portion (or there about) of the UEs may transmit to the RN in a second phase, and so forth.

The RN may make use of signals in the transmissions to estimate (infer) communications channel characteristics and/or information about communications channels between the individual eNBs and UEs and the RN (block 307). As an example, the RN may make use of pilot signals, reference sequences, or other sequences in the transmissions received from the eNBs and the UEs to estimate communications channel characteristics and/or information about the communications channels. According to an example embodiment, the RN may make use of signals transmitted by an eNB or a UE to estimate its respective communications channel. According to another example embodiment, instead of using a specially transmitted signal to perform channel estimation, the RN may make measurements of transmissions made by the eNBs and the UEs over time to perform channel estimation.

The RN may also store a modulated and channel encoded control and a modulated and channel encoded data portion of the transmissions (as well as other information contained in the transmissions that the RN may not use in performing its relaying duties) (block 309). According to an example embodiment, portions of the transmissions from the eNBs and the UEs that are not pilot signals, reference sequences, and so on, are stored. According to an example embodiment, in some situations, the entirety of the transmissions are stored if it is difficult to remove the pilot signals, reference sequences, and so on. According to an example embodiment, the RN may store the modulated and channel encoded control and data portion of the transmissions (and the other information) in a buffer, a memory, a primary storage, a secondary storage, or so forth.

The RN may use the channel estimates to construct a precoding matrix W (block 311). W may be a N×N matrix, where N is the number of transmit antennas at the RN. According to an example embodiment, W may be designed to maximize a downlink sum-rate, to achieve maximal signal plus interference to noise ratio (SINR), or so forth, for one user. Alternatively, W may be designed to meet a performance objective relating to the collective SINRs over multiple UEs or all UEs, such as a maximization of a weighted sum of SINRs, for example.

W may then be used to precode a transmission of the stored modulated and channel encoded control and data portion of the transmissions (block 313), which may then be transmitted (for example, broadcast) to the eNBs and the UEs (block 315). Note that the precoding matrix W may be applied to at least a portion of a combination, e.g., sum, of received signals from the eNBs and the UEs participating in the two-way communications with the RN, and not to the individual signal from each UE and/or eNB. Furthermore, there may be other UEs and/or eNBs that may be operating within signal detection area of the RN and the UEs and/or the eNBs, however they are not participating in two-way communications with the RN.

The RN may also provide W to the eNBs and the UEs (block 317). W may be broadcast to the eNBs and the UEs on a separate control channel or a shared control channel. W may also be transmitted on a limited feed-forward or feedback link. According to an example embodiment, the RN may provide W to the eNBs and the UEs in a periodic manner. According to an alternative example embodiment, the RN may provide W to the eNBs and the UEs whenever it makes an update to W. According to an alternative example embodiment, the RN may provide W to the eNBs and the UEs whenever it makes a specified number of updates to W. According to an alternative example embodiment, the RN may provide W to the eNBs and the UEs whenever it receives a request to provide W.

Since W may be large in size, the RN may employ any number of techniques to reduce the amount of information needed to provide W to the eNBs and the UEs. For example, W may be compressed, quantized, or otherwise reduced in size prior to transmission. Additionally, the RN may provide differential information about W instead of a complete version of W when it provides an update of W. Furthermore, the RN may provide a function of W to the eNBs and the UEs.

FIG. 3b illustrates a flow diagram of communications device operations 350 in communications, wherein a RN operating in a two-way relaying mode relays communications to and from a communications device. Communications device operations 350 may be indicative of operations occurring in a communications device, such as an eNB and/or a UE, as the communications device receives and transmits to a RN operating in a two-way relaying mode. Communications device operations 350 may occur while the communications device is coupled to a RN that is in the two-way relaying mode.

Communications device operations 350 may begin with the communications device transmitting signals (transmissions) to the RN (block 355). According to an example embodiment, the communications device may transmit to the RN at substantially the same time as other communications devices, such as eNBs and UEs, coupled to the RN. According to another example embodiment, the communications device may transmit to the RN at a time when other communications devices of the same type as the communications device transmit to the RN.

The communications device may then receive a transmission from RN, where the transmission has been precoded with W (block 357). According to an example embodiment, the received transmission may be a broadcast signal intended for the UEs and/or the eNB that are participating with the RN in two-way communications. The communications device may also receive W, a compressed version of W, a portion of W, a differential version of W, a function of W, or so on, from the RN (block 359). If the communications device receives W in an alternate form, the communications device may need to reconstruct W and/or otherwise update W.

The communications device may decode the precoded transmission (block 361). According to an example embodiment, the communications device may make use of W to decode the precoded transmission. As an example, the communications device may make use of W as well as information regarding their respective communications channels to cancel self-interference and subsequently decode the precoded transmission.

Figure 4A:
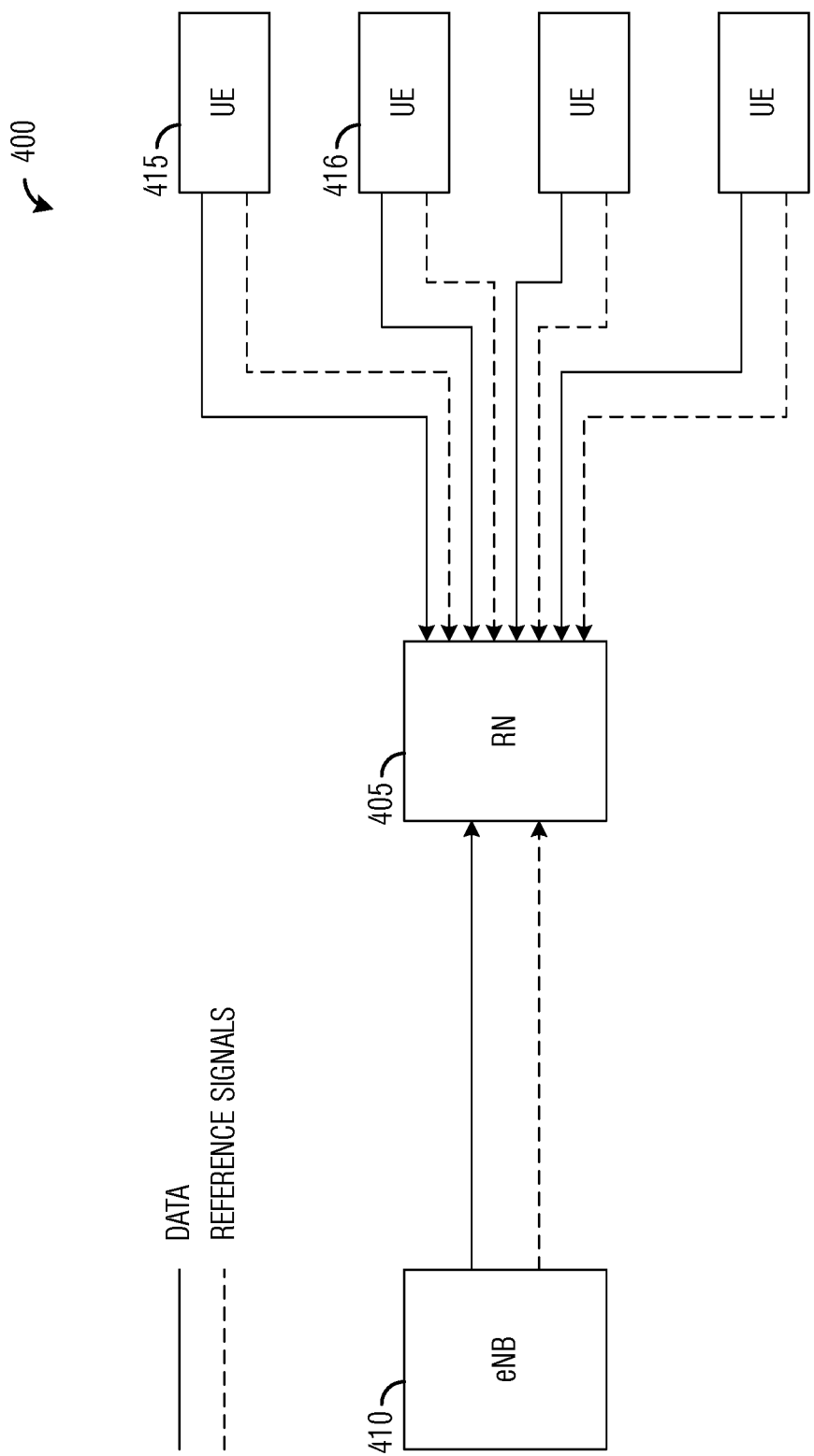
FIG. 4a illustrates an example communications system with a RN operating in a MA phase according to example embodiments described herein.

FIG. 4a illustrates a communications system 400 with a RN operating in a MA phase. Communications system 400 includes a RN 405 that is coupled to an eNB 410 and a plurality of UEs, such as UE 415 and UE 416, with RN 405 operating in the MA phase. As discussed previously, during the MA phase, RN 405 receives transmissions from eNB 410 and/or the plurality of UEs. Transmissions from eNB 410 and/or the plurality of UEs may arrive at RN 405 substantially simultaneously, in distinct phases with transmissions from eNB 410 (and other eNBs) arriving in a first phase and transmissions from the plurality of UEs arriving in a second phase. Transmissions from eNB 410 and the plurality of UEs comprises data (shown as solid lines) and/or reference signals (shown as dashed lines).

Figure 4B:
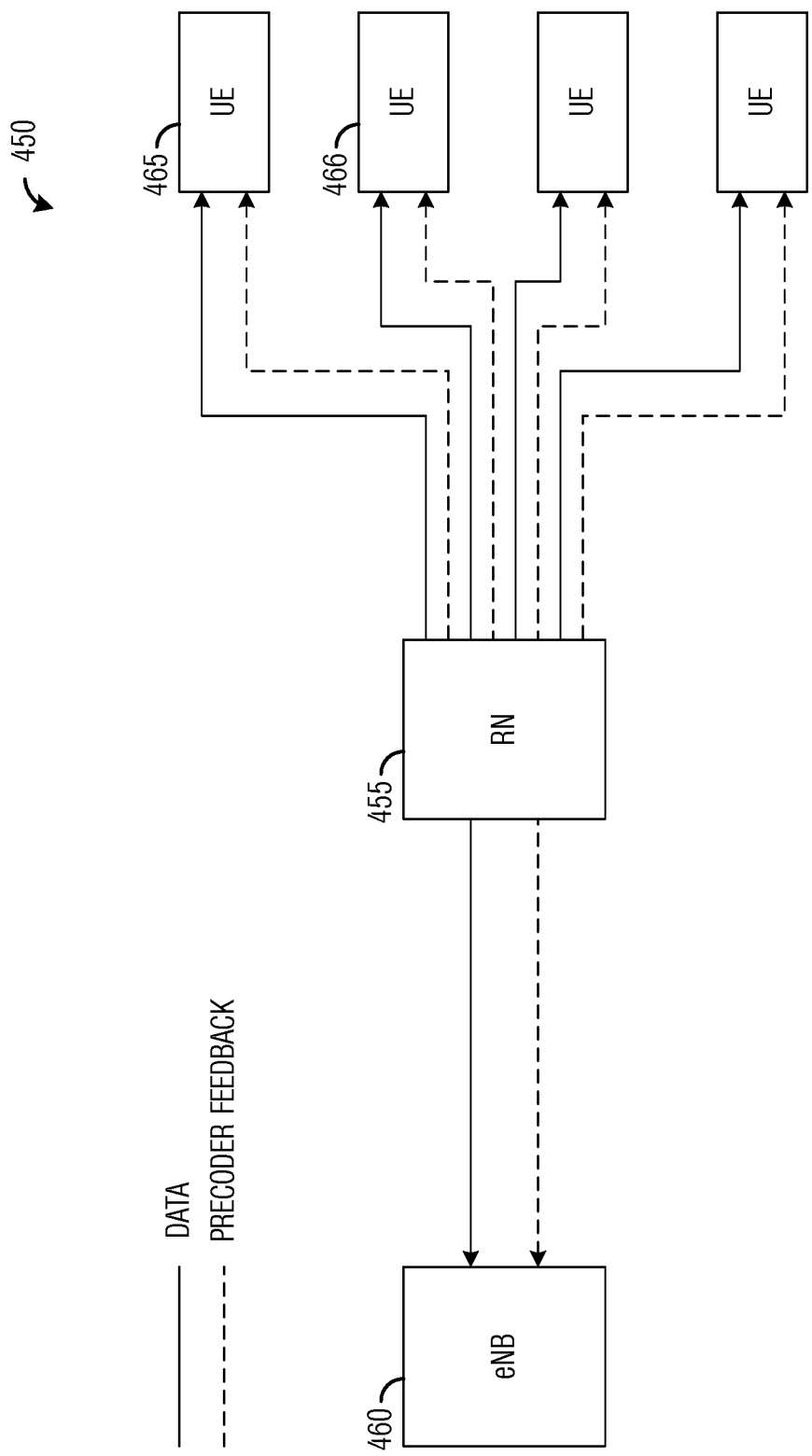
FIG. 4b illustrates an example communications system with a RN operating in a BC phase according to example embodiments described herein.

FIG. 4b illustrates a communications system 450 with a RN operating in a BC phase. Communications system 450 includes a RN 455 that is coupled to an eNB 460 and a plurality of UEs, such as UE 465 and UE 466, with RN 455 operating in the BC phase. As discussed previously, during the BC phase, RN 455 transmits to eNB 410 and/or the plurality of UEs by broadcasting precoded transmissions. The transmissions may be precoded with a precoder based on channel characteristics and/or information for communications channels between RN 455 and eNB 410 and/or the plurality of UEs. Transmissions from RN 455 comprise data (shown as solid lines) and/or precoder (W) feedback (shown as dashed lines).

Generally, $g_k$, the channel matrix for a communications channel between a k-th UE and a RN may be obtained by measuring a set of pilots, reference signals, or so forth, transmitted by the k-th UE. However, if both eNBs and UEs coupled to the RN are transmitting simultaneously (or substantially simultaneously), with the transmissions from the eNBs usually being transmitted at a significantly higher power level than the transmissions from the UEs, then obtaining accurate and/or clean values for $g_k$ may be difficult. But, accurate and/or clean values for $g_k$ may be important since it will help to ensure accurate determination of W. Therefore, a frame structure that enables accurate determination of channel statistics and/or information between the eNBs and the UEs to the RN is needed.

Figure 5A:
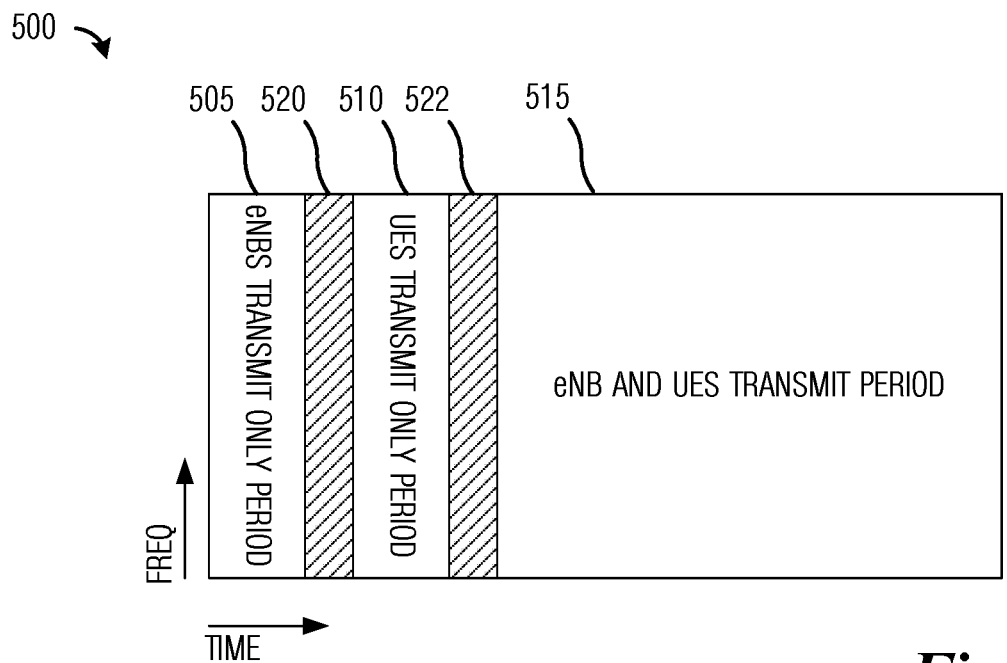
FIG. 5a illustrates an example structure of a transmission frame according to example embodiments described herein.

FIG. 5a illustrates a structure of a transmission frame 500. Transmission frame 500 may be representative of a transmission frame received by a RN while the RN is operating in a MA mode. According to an example embodiment, transmission frame 500 includes several features to help the RN make accurate determination of channel statistics and/or information between communications devices, such as eNBs and UEs, coupled to the RN. Transmission frame 500 may include time domain resources, frequency domain resources, or both time domain and frequency domain resources.

Transmission frame 500 includes a first interval 505 wherein only eNBs coupled to the RN may transmit and a second interval 510 wherein only UEs coupled to the RN may transmit. First interval 505 and second interval 510 may be referred to as exclusive transmission intervals. By segregating eNB transmissions from UE transmissions, significant transmission power level mismatches may be reduced, thereby simplifying the RN's task of making accurate determination of communications channels between the eNBs and the UEs to the RN.

According to an example embodiment, during the exclusive transmission intervals, which ever type of communications device that is allowed to transmit may transmit signals that may assist the RN in making determination of respective communications channels. For example, the communications devices may transmit pilots, reference sequences, and so forth. However, if a communications device has already transmitted its pilots, reference sequences, and so forth, or if the communications device has data and/or control signaling that it needs to transmit, then the communications device may transmit the data and/or control signaling in place of or in combination with the pilots, reference sequences, and so forth.

According to an example embodiment within second interval 510, pilots, reference sequences, and so forth, transmitted by the UEs may be multiplexed using techniques such as code multiplexing, different phase offset, frequency offsets, time multiplexing, or combinations thereof. Furthermore UE specific information may also be transmitted to the RN during second interval 510.

According to an example embodiment, it may be possible to partition the exclusive transmission intervals (first interval 505 and/or second interval 510, for example) into multiple parts to permit different subsets of a type of communications device to transmit. Partitioning a relatively large number of communications devices into multiple subsets may help prevent a situation wherein too many communications devices are transmitting at the same time and potentially decrease performance.

Transmission frame 500 also includes a third interval 515 wherein both eNBs and UEs coupled to the RN may transmit. During third interval 515, eNBs and UEs may transmit as described during MA operation. According to an embodiment, during third interval 515 both eNBs and UEs may transmit data and/or control signaling, and in some circumstances, pilots, reference signals, and so forth. Generally, since data and/or control signaling requirements are greater than pilots, reference sequences, and so forth, third interval 515 may be larger (for example, longer in duration, wider in frequency span, or a combination of both) than first interval 505 and/or second interval 510.

Although shown in FIG. 5*a* as being time division multiplexed, first interval 505, second interval 510, and/or third interval 515 may be time division multiplexed, frequency division multiplexed, code division multiplexed, or combinations thereof.

According to an example embodiment, due to the usually high transmit power level of eNB transmissions, first interval 505 may be optional. However, to help improve communications system performance, second interval 510 may be a mandatory part of transmission frame 500.

Transmission frame 500 may also include guard intervals, such as guard interval 520 and guard interval 522, to accommodate timing advance, errors in synchronization, and so forth.

Although shown in FIG. 5*a* as being in numerical order, i.e., first interval 505 before second interval 510 before third interval 515, the intervals may occur in any order.

Figure 5B:
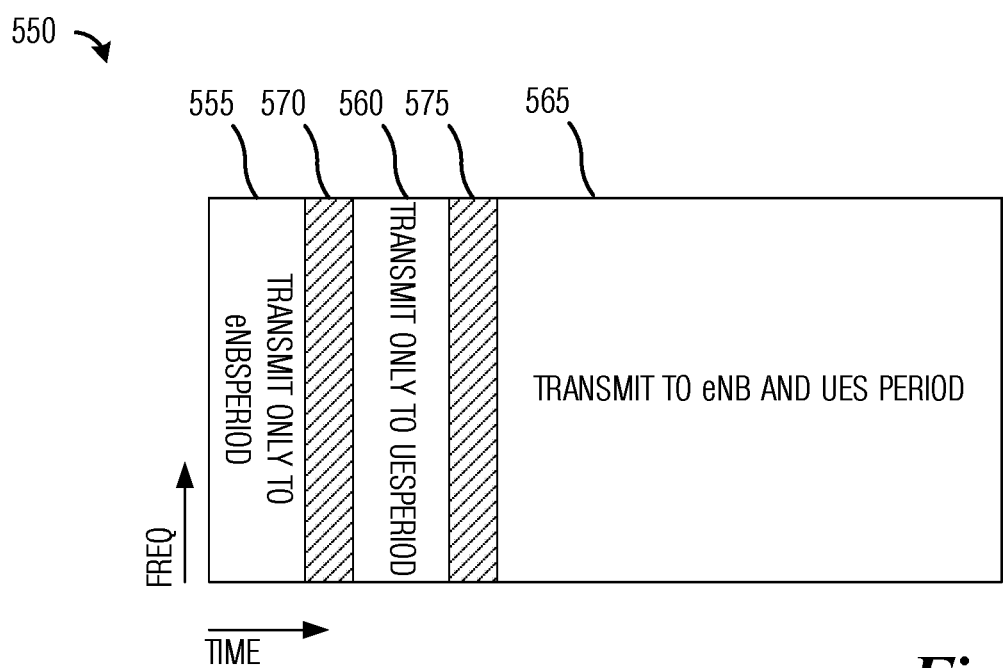
FIG. 5b illustrates an example structure of a transmission frame according to example embodiments described herein.

Although transmission frame 500 is described for transmissions being received by the RN, transmission frame 500 or a similar transmission frame may be used when the RN is transmitting, i.e., the RN is operating in the BC mode, such as transmission frame 550 shown in FIG. 5*b*. When the RN is transmitting, a transmission frame with a first interval for transmissions to the eNBs alone (such as in interval 555), a second interval for transmissions to the UEs alone (such as in interval 560), and a third interval for transmission to the eNBs and the UEs may be used (such as in interval 565). Furthermore, guard intervals 570 and 575 may be present. According to an example embodiment, in the exclusive transmission intervals (the first interval and/or the second interval) no network coding may be required. Furthermore, in an interval reserved for transmissions to the UEs may be used to send data, such as transmitting W information.

Figure 6A:
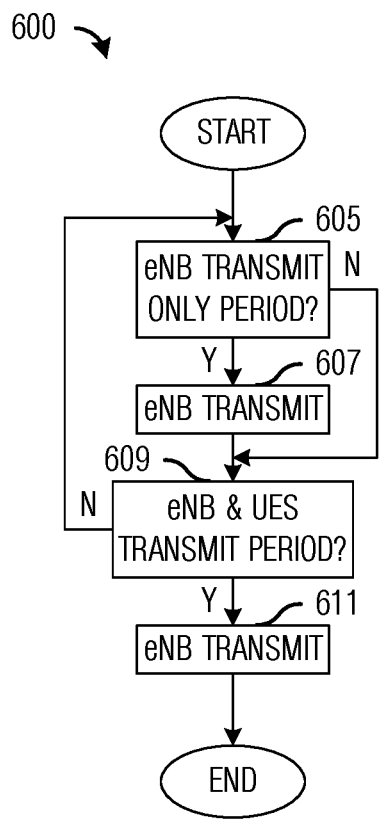
FIG. 6a illustrates an example flow diagram of eNB operations in transmitting according to example embodiments described herein.

FIG. 6*a* illustrates a flow diagram of eNB operations 600 in transmitting. eNB operations 600 may be indicative of operations occurring in an eNB as the eNB transmits to a RN with the RN operating in a MA mode and the eNB is following a transmission frame format that allows for exclusive transmission by a specific type of communications device, such as shown in FIG. 5*a*. eNB operations 600 may occur while the eNB is in a normal operating mode and while the eNB is coupled to the RN that is operating in the MA mode.

eNB operations 600 may begin with the eNB performing a check to determine if the RN is currently expecting transmissions only from eNBs, i.e., the RN is in an eNB only exclusive transmission interval (block 605). If the RN is currently expecting transmissions only from the eNB, then the eNB may transmit (block 607). According to an example embodiment, the eNB may transmit pilots, reference sequences, and so forth. However, it may be possible for the eNB to also transmit data and/or control signaling.

If the RN is not expecting transmissions from eNBs or if the eNB only exclusive transmission interval is over, then the eNB may perform a check to determine if the RN is currently expecting transmissions from eNBs as well as other communications devices, i.e., the RN is not in an eNB only exclusive transmission interval but is in an interval that will allow transmissions from eNBs (block 609). If the RN is allowing transmissions from the eNB, then the eNB may transmit (block 6*n*).

Figure 6B:
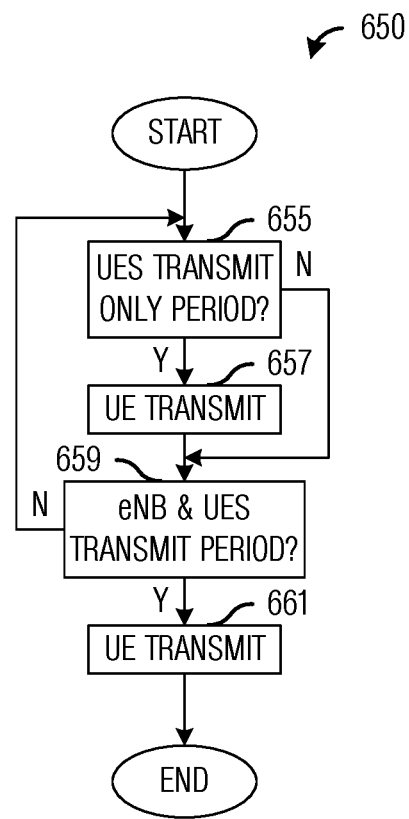
FIG. 6b illustrates an example flow diagram of UE operations in transmitting according to example embodiments described herein.

FIG. 6*b* illustrates a flow diagram of UE operations 650 in transmitting. UE operations 650 may be indicative of operations occurring in a UE as the UE transmits to a RN with the RN operating in a MA mode and the UE is following a transmission frame format that allows for exclusive transmission by a specific type of communications device, such as shown in FIG. 5*a*. UE operations 650 may occur while the UE is in a normal operating mode and while the UE is coupled to the RN that is operating in the MA mode.

UE operations 650 may begin with the UE performing a check to determine if the RN is currently expecting transmissions only from UE, i.e., the RN is in a UE only exclusive transmission interval (block 655). If the RN is currently expecting transmissions only from the UE, then the UE may transmit (block 657). According to an example embodiment, the UE may transmit pilots, reference sequences, and so forth. However, it may be possible for the UE to also transmit data and/or control signaling.

If the RN is not expecting transmissions from UEs or if the UE only exclusive transmission interval is over, then the UE may perform a check to determine if the RN is currently expecting transmissions from UEs as well as other communications devices, i.e., the RN is not in a UE only exclusive transmission interval but is in an interval that will allow transmissions from UEs (block 659). If the RN is allowing transmissions from the UE, then the UE may transmit (block 661).

Although the description of FIGS. 6*a* and 6*b* focuses on operations wherein an eNB and a UE transmits to a RN following a transmit frame structure similar to one shown in FIG. 5*a*, the flow diagrams shown in FIGS. 6*a* and 6*b* may also apply to a RN that is transmitting to eNBs and UEs following a similar frame structure that allows for exclusive transmission to different types of communications devices.

Determining W may be a computationally difficult problem that can place a significant burden on any one communications device, namely a RN. Therefore, there is a desire to distribute the computational burden on multiple communications devices, such as a RN and communications devices coupled to the RN. By distributing the computational load over multiple communications devices, the computational load on any one communications device may be significantly reduced. Furthermore, since W does not require frequent updates, communications involved in coordinating the distribution of the computation may not become a significant performance bottleneck.

Considering the problem of designing a precoding matrix to maximize the SINR of the UEs under an average delay transmit power constraint. Given a single precoding matrix W, it may be ambitious if not infeasible to expect to maximize every UE's SINR. A more conventional approach may be to design W so that a global system parameter is obtained, for example, maximizing the minimum SINR over the UEs. Another approach is to guarantee a minimum level of Quality of Service to the UEs, for example, requiring a minimum bound on each UE's capacity rate.

First, consider designing W such that the k-th UE's SINR is maximized without regard to other UE's SINR, which may be expressed as $$\max_{\|Wr\|_2^2 = P_r} SINR_k.$$

The generalized Rayleigh quotient $$\left(SINR_k = \frac{g_k^* W A_k W^* g_k}{g_k^* W B_k W^* g_k}\right)$$

renders a solution to the above obtained from the generalized eigen-decomposition. To simplify the notation, let $\tilde{v}_k = W^* g_k$. The SINR expression presented above is scale-invariant with regard to the magnitude of W. As a consequence, the power constraint may be satisfied by scaling W. Relaxing the power constraint, the relay power constraint becomes $$\max_{\tilde{v}_k} \frac{\tilde{v}_k^* A_k \tilde{v}_k}{\tilde{v}_k^* B_k \tilde{v}_k}.$$

The gradient of the objective with respect to $\bar{v}_k$ is expressible as $$\frac{\partial SINR_k}{\partial W} = \frac{2 A_k \tilde{v}_k (\tilde{v}_k^* B_k \tilde{v}_k) - 2(\tilde{v}_k^* A_k \tilde{v}_k) B_k \tilde{v}_k}{(\tilde{v}_k^* B_k \tilde{v}_k)^2}$$

$$= \frac{2 A_k \tilde{v}_k - 2(SINR_k) B_k \tilde{v}_k}{\tilde{v}_k^* B_k \tilde{v}_k}$$

with a necessary optimality condition of $$\frac{\partial SINR_k}{\partial W} = 0,$$

which gives $$A_k \bar{v}_k = (SINR_k) B_k \bar{v}_k.$$

By definition, the above is a generalized eigenvalue problem in the matrix pair $\{A_k, B_k\}$, where $SINR_k$ and $\bar{v}_k$ denote the eigenvalues and the eigenvectors, respectively. The equation $(A_k \bar{v}_k = (SINR_k) B_k \bar{v}_k)$ shows that the extremum (stationary) points of $$\left(\max_{\tilde{v}_k} \frac{\tilde{v}_k^* A_k \tilde{v}_k}{\tilde{v}_k^* B_k \tilde{v}_k}\right)$$

are obtained as the eigenvectors of the generalized eigenvalue problem and the maximum SINR is obtained by a principle eigenvector corresponding to the maximum eigenvalue. Let $\tilde{v}_k$ be the solution for the k-th user. Substituting for the change of variable, $v_k = W^* g_k$, and reinstating the relay power constraint, the following are necessary optimality conditions on W $$W^* g_k = v_k \quad \text{(CI)}$$

$$r^* W^* W r = P_r. \quad \text{(CII)}$$

In summary, any precoder that satisfies conditions (CI) and (CII) is (to a scaler multiple) an optimal precoder in the sense of maximizing the SINR for the k-th UE. Finding such a precoder may be difficult.

FIG. 7a illustrates a flow diagram of RN operations 700 in transmitting to communications devices coupled to a RN, wherein transmissions are precoded with a precoding matrix W that is determined in a distributed manner. RN operations 700 may be indicative of operations in a RN as the RN determines the precoding matrix W and uses the precoding matrix W to precode transmissions to communications devices coupled to the RN. RN operations 700 may occur while the RN is in a normal operating mode and is coupled to communications devices.

RN operations 700 may begin with the RN transmitting transmission parameters to the communications devices, i.e., the eNBs and the UEs (block 705). In general, transmission parameters include channel information, beamforming coefficients, transmission power information, number of communications devices, and so on. Examples of transmission parameters may be for a k-th communications device $$A_k = H f_k f_k^* H^*$$

and $$B_k = \sum_{i \neq k}^{K} \left( H f_i f_i^* H^* + \frac{K P_u}{P_d} g_i g_i^* \right) + \frac{K N_0}{P_d} \left( 1 + \frac{1}{g_k^* W W^* g_k} \right) I,$$

or equivalent parameters.

Although the RN may compute $A_k$ and $B_k$ on its own if it is aware of H, $f_k$, and $g_k$. However, computational complexity may be large, especially if an iterative algorithm is being used. The computation may be distributed to multiple communications devices to help reduce the computation complexity at any one communications device.

With the transmission parameters, the k-th communications device may solve an eigenvector problem expressed as $$A_k \bar{v}_k = (SINR_k) B_k \bar{v}_k$$

for the precoding vector $\bar{v}_k$ and transmits $\bar{v}_k$ back to the RN.

The RN may receive the precoding vector $\bar{v}_k$ from the k-th communications device (block 707). According to an example embodiment, the RN may receive a precoding vector from each of the communications devices coupled to it, and the RN may make use of the precoding vectors to solve for W (block 709).

Depending on the values provided by the communications devices, the RN may solve for W with conditions CI and CII using a variety of techniques, such as amplify-and-forward precoding, scaled inverse precoding, unitary precoding, iteratively constrained precoding, gradient ascent, and so forth.

The RN may make use of W to precode transmissions to the communications devices that are participating in two-way communications with the RN (block 711) and transmit the precoded transmissions to the communications devices (block 713). The RN may also provide W, updates to W, a function of W, a compressed version of W, or so forth to the communications devices (block 715).

FIG. 7b illustrates a flow diagram of communications device operations 750 in receiving and decoding transmissions from a RN, wherein the transmissions are precoded with a precoding matrix W that is determined in a distributed manner. Communications device operations 750 may be indicative of operations in a communications device, such as an eNB and/or a UE, as the communications device assists the RN in determining the precoding matrix W to help reduce a computational load on the RN, and then receives a transmission from the RN that has been precoded with the precoding matrix W. The communications device may also decode the precoded transmission from the communications device. Communications device operations 750 may occur while the communications device is in a normal operating mode and is coupled to a RN.

Communications device operations 750 may begin with the communications device receiving transmission parameters from the RN (block 755). Examples of transmission parameters at a k-th communications device may include $$A_k = H f_k f_k^* H^*$$

and $$B_k = \sum_{i \neq k}^{K} \left( H f_i f_i^* H^* + \frac{K P_u}{P_d} g_i g_i^* \right) + \frac{K N_0}{P_d} \left( 1 + \frac{1}{g_k^* W W^* g_k} \right) I.$$

With the transmission parameters, the communications device may solve an eigenvector problem (block 757). As an example, at the k-th communications device the eigenvector problem expressed as $$A_k \bar{v}_k = (\text{SINR}_k) B_k \bar{v}_k,$$

and the k-th communications device may solve for the precoding vector $\bar{v}_k$. The communications device may send the precoding vector $\bar{v}_k$ to the RN (block 759).

The communications device may receive a transmission from the RN, wherein the transmission is precoded using the precoding matrix W, which was computed based in part on the precoding vector $\bar{v}_k$ provided by the communications device (block 761). According to an example embodiment, the received transmission may be a broadcast signal intended for the UEs and/or the eNB that are participating with the RN in two-way communications.

The communications device may also receive the precoding matrix W from the RN (block 763). According to an example embodiment, the RN may provide the precoding matrix W, updates to W, a function of W, a compressed version of W, or so forth to the communications device.

The communications device may decode the precoded transmission utilizing the precoding matrix W (block 765).

According to an example embodiment, instead of sending communications device specific transmissions parameters, such as $A_k$ and $B_k$, the RN may transmit non-communications device specific transmissions parameters, such as $g_k$, H, $f_k$, and so forth. An advantage of providing non-communications device specific transmissions parameters is that instead of dedicated signaling to each of the communications devices, the RN may broadcast the non-communications device specific transmissions parameters to all of the communications devices.

According to an example embodiment, the techniques described in FIGS. 7a and 7b do not need to be fully distributed, i.e., not every communications device needs to be involved in assisting the RN determine the precoding matrix W. Rather, the RN may decide to have a subset of communications devices performing the computations. For instance, if there are low capability communications device and there are high capability communications devices, then the RN may decide to use only the high capability communications devices in performing the computations. The RN may perform the computations for the low capability communications devices itself.

In addition to communications device capability, the RN may select communications devices based on factors such as communications device idle and/or busy percentages, communications device load, communications device priority, communications device performance (e.g., quality of service) requirements, and so forth.

Furthermore, the RN may select different subsets of communications devices that it has assist it in determining the precoding matrix W based on a history of communications devices. As an example, the RN may assign different subsets of communications devices over time, so that eventually, all of the communications devices would have assisted the RN in determining the precoding matrix W.

According to an example embodiment, if distributed algorithms are used, additional information, such as W(i) for the i-th iteration of W, may also be sent to the communications devices by the RN.

According to an embodiment, the RN may also indicate which algorithm is to be used to compute the information that will be used by the RN in determining W. Indicating which algorithm to be used may be needed since the information to be provided to the RN may differ depending on the algorithm used to determine W.

Figure 8:
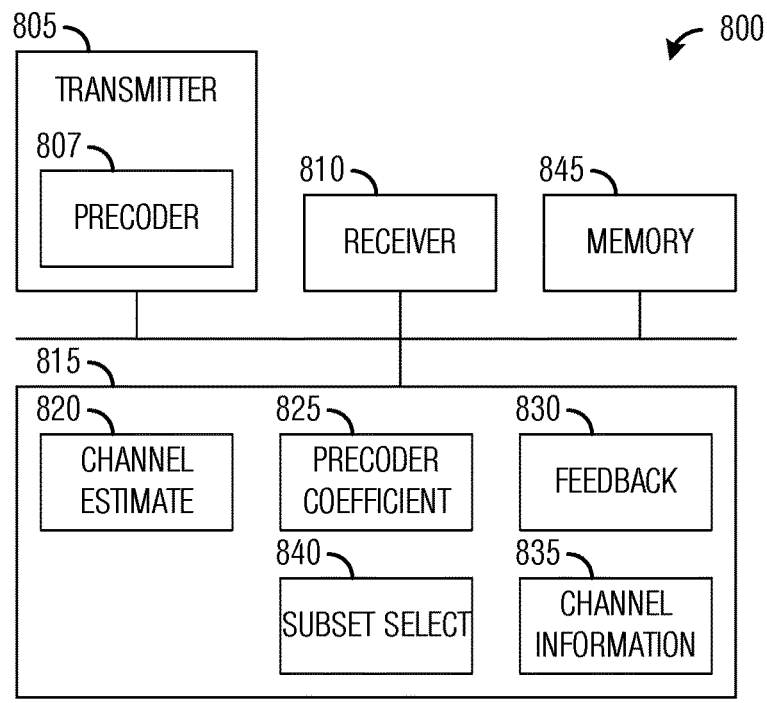
FIG. 8 illustrates an example communications device according to example embodiments described herein.

FIG. 8 provides an alternate illustration of a communications device 800. Communications device 800 may be an implementation of RN. Communications device 800 may be used to implement various ones of the embodiments discussed herein. As shown in FIG. 8, a transmitter 805 is configured to transmit information and a receiver 810 is configured to receive information. Transmitter 805 includes a precoder 807 that is configured to precode transmissions with a precoding matrix, such as precoding matrix W.

A channel estimate unit 820 is configured to estimate channels between communications device 800 and communications devices coupled to communications device 800. Channel estimate unit 820 makes use of pilots, reference sequences, and so forth, transmitted by the communications devices. A precoder coefficient unit 825 is configured to process and/or select precoder coefficients for use by precoder 807. Precoder coefficient unit 825 processes precoder coefficients based on the channel estimates provided by channel estimate unit 820. A feedback unit 830 is configured to provide (i.e., feedback) information, such as a precoder matrix or information about a precoder matrix, to communications devices. A channel information unit 835 is configured to determine channel information about communications channels between communications device 800 and communications devices coupled to communications device 800. A subset select unit 840 is configured to select a subset of communications devices from communications devices coupled to communications device 800, such as for determining the precoding matrix W, for example. A memory 845 is configured to store precoding matrix (matrices), precoding vector(s), precoding coefficient(s), channel information, channel estimates, data, etc.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while channel estimate unit 820, precoder coefficient unit 825, feedback unit 830, channel information unit 835, and subset select unit 840 may be software modules executing in a microprocessor (such as processor 815) or a custom circuit or a custom compiled logic array of a field programmable logic array.

Figure 9:
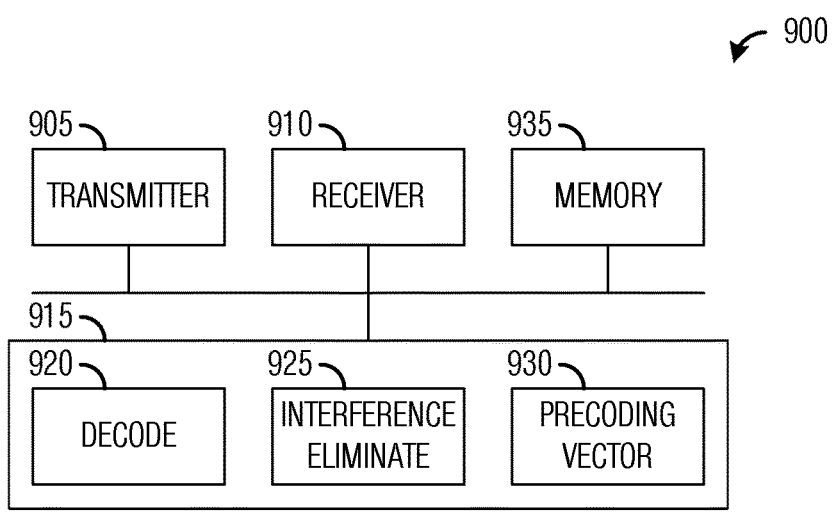
FIG. 9 illustrates an example communications device according to example embodiments described herein.

FIG. 9 provides an alternate illustration of a communications device 900. Communications device 900 may be an implementation of an eNB and/or a UE. Communications device 900 may be used to implement various ones of the embodiments discussed herein. As shown in FIG. 9, a transmitter 905 is configured to transmit information and a receiver 910 is configured to receive information.

A decoder 920 is configured to decode transmissions received by communications device 900. Decoder 920 may use a precoding matrix to decode the transmissions. An interference eliminate unit 925 is configured to eliminate interference present in received transmissions, such as self-interference and interference from communications between other communications devices. A precoding vector unit 930 is configured to solve eigenvector value problems using transmission parameters provided by communications devices coupled to communications device 900 to determine a precoding vector(s). A memory 935 is configured to store precoding matrix (matrices), precoding vector(s), precoding coefficient(s), channel information, channel estimates, eigenvalues, transmission parameters, algorithm types, etc.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while decoder 920, interference eliminate unit 925, and precoding vector unit 930 may be software modules executing in a microprocessor (such as processor 915) or a custom circuit or a custom compiled logic array of a field programmable logic array.

The above described embodiments of communications device 700 and communications device 800 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non-use) of steps and/or acts in the recitation of the claims—and in the description of the flow diagrams(s) for FIGS. 3*a*, 3*b*, 6*a*, 6*b*, 7*a*, and 7*b*—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   transmitting, by a relay, transmission parameters to first communications devices coupled to the relay;
   receiving, by the relay, precoding vectors from one or more of the first communications devices;
   transmitting, by the relay to at least one of the first communications devices, a precoding matrix based on the precoding vectors; and
   transmitting, by the relay, a transmission signal to at least a second communications device, the signal including a combination of at least a a stored portion of received transmissions of the first communications devices, the transmission signal being precoded with the precoding matrix.

2. The method of claim 1, wherein the stored portion of the transmissions includes modulated and channel encoded control information.

3. The method of claim 1, wherein the stored portion of the transmissions includes modulated and channel encoded data.

4. The method of claim 1, wherein the transmission parameters include communications channel information.

5. The method of claim 1, wherein the transmission parameters include beamforming coefficients.

6. The method of claim 1, wherein the transmission parameters include transmission power information.

7. The method of claim 1, wherein the transmission parameters specify a number of communications devices.

8. The method of claim 1, further comprising determining the precoding matrix by solving for the precoding matrix contingent on a condition.

9. The method of claim 8, wherein solving for the precoding matrix comprises using amplify-and-forward precoding, scaled inverse precoding, unitary precoding, iteratively constrained precoding, gradient ascent, or a combination thereof.

10. A relay comprising:
    a processor; and a non-transitory computer readable storage medium storing programming for execution by the processor, the programming including instructions to:

transmit transmission parameters to first communications devices coupled to the relay;

receive precoding vectors from one or more of the first communications devices;

transmit, to at least one of the first communications devices, a precoding matrix based on the precoding vectors; and transmit, by the relay, a transmission signal to at least a second communications device, the signal including a combination of at least a stored portion of received transmissions of the first communications devices, the transmission signal being precoded with the precoding matrix.

11. The relay of claim 10, wherein the stored portion of the transmissions includes modulated and channel encoded control information.

12. The relay of claim 10, wherein the stored portion of the transmissions includes modulated and channel encoded data.

13. The relay of claim 10, wherein the transmission parameters include communications channel information.

14. The relay of claim 10, wherein the transmission parameters include beamforming coefficients.

15. The relay of claim 10, wherein the transmission parameters include transmission power information.

16. The relay of claim 10, wherein the transmission parameters specify a number of communications devices.

17. The relay of claim 10, wherein the programming further includes instructions to determine the precoding matrix by solving for the precoding matrix contingent on a condition.

18. The relay of claim 17, wherein the precoding matrix is solved using amplify-and-forward precoding, scaled inverse precoding, unitary precoding, iteratively constrained precoding, gradient ascent, or a combination thereof.

19. A method comprising:

receiving, by a first communications device, transmission parameters from a relay; transmitting, by the first communications device to the relay, a precoding vector based on the transmission parameters;

transmitting, by the first communications device, a first transmission to the relay, transmitting the first transmission to the relay prompting the relay to store at least a portion of the transmission, to precode the stored portion of the first transmission using the precoding matrix, and to transmit the resulting precoded signal in a transmissions signal to a second communications device.

20. The method of claim 19, further comprising determining the precoding vector by solving an eigenvector problem involving the transmission parameters.

21. A first communications device comprising:

a processor; and a non-transitory computer readable storage medium storing programming for execution by the processor, the programming including instructions to:

receive transmission parameters from a relay;

transmit, to the relay, a precoding vector based on the transmission parameters;

transmit a first transmission to the relay, transmitting the first transmission to the relay prompting the relay to store at least a portion of the transmission, to precode the stored portion of the first transmission using the precoding matrix, and to transmit the resulting precoded signal in a transmissions signal to a second communications device.

22. The communications device of claim 21, wherein the one or more processors execute the instructions to determine the precoding vector by solving an eigenvector problem involving the transmission parameters.

* * * * *

UNITED STATES PATENT AND TRADEMARK OFFICE
CERTIFICATE OF CORRECTION

PATENT NO. : 10,951,275 B2
APPLICATION NO. : 16/354641
DATED : March 16, 2021
INVENTOR(S) : Ali Yazdan Panah Page 1 of 1

It is certified that error appears in the above-identified patent and that said Letters Patent is hereby corrected as shown below:

In the Claims

In Column 18, Line 40, Claim 1, delete "a a" and insert --a--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*